INVENTORS
William S. McLay
Howard J. Evans
By Strauch & Hoffman
Attorneys

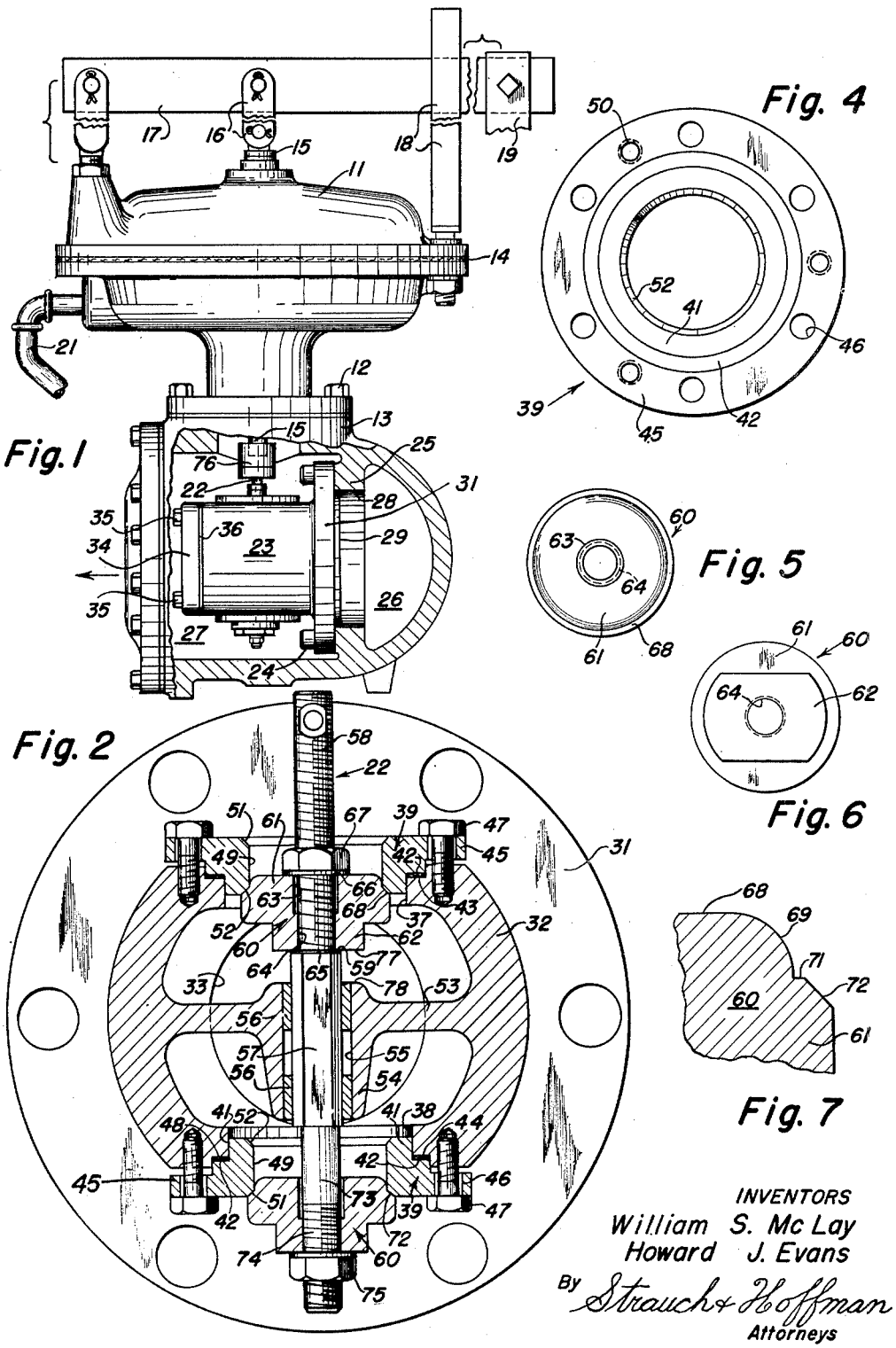

United States Patent Office 2,700,981
Patented Feb. 1, 1955

2,700,981

CENTER GUIDE INLET BOWL

William S. McLay, Pittsburgh, and Howard J. Evans, Dubois, Pa., assignors to Rockwell Manufacturing Company, Pittsburgh, Pa., a corporation of Pennsylvania Application June 7, 1949, Serial No. 97,694

7 Claims. (Cl. 137—271)

This invention relates to pressure regulators and particularly to balanced valve regulators for high pressure gas service.

In its preferred embodiment the invention comprises improvements over the regulator disclosed in MacLean Patent No. 2,195,337 issued March 26, 1940, and has for its main object the reduction of noise, vibration and wear and the general improvement of structural parts in such a regulator.

A further object of the invention is to provide a pressure regulator having novel interchangeable reversible valve seat members.

It is a further object of the invention to provide a balanced valve pressure regulator having identical and interchangeable upper and lower valves.

A further object of the invention is to provide a novel valve stem and associated valve structure in a pressure regulator.

A further object of the invention is to provide a novel valve stem and cooperating guide construction in a balance valve pressure regulator.

Further objects of the invention will presently appear as the description proceeds in connection with the appended claims and the annexed drawings wherein:

Figure 1 is a side elevation partly broken away and in section of a balanced valve pressure regulator embodying the invention;

Figure 2 is an enlarged section along the valve stem mounted in the inlet bowl in the regulator of Figure 1 illustrating the valve, valve seat and stem guide structures in the hard seat valve embodiment of the invention;

Figure 4 is a plan view of one of the reversible valve seat members;

Figures 5 and 6 are top and bottom plan views respectively of a valve;

Figure 7 is an enlarged fragmentary section illustrating a detail of the valve seating face.

Figure 3:
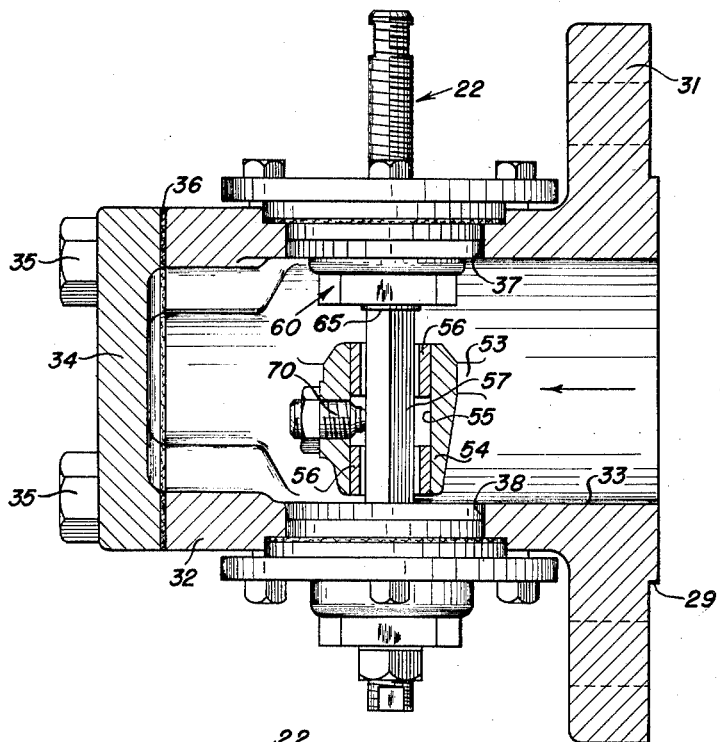
Figure 3 is a section along the valve stem at right angles to that of Figure 2, illustrating further valve stem and guide details.

The pressure regulator illustrated in Figure 1 comprises a diaphragm casing 11 to which is secured, as by bolts 12, a valve casing 13. The interior of the diaphragm casing contains a flexible diaphragm 14, the edge of which is clamped between parts of the casing 11, and the center of the diaphragm is secured in the usual manner to a vertical stem 15 that projects upwardly from the casing. Stem 15 is pivotally connected by a link 16 to a pivoted lever 17 freely movable within a vertical guide channel 18 and biased downwardly by a weight arm 19 fixed to lever 17. A control pressure, preferably the gas outlet pressure downstream of valve casing 13, is applied to the bottom of the diaphragm, as by a conduit 21. Since valve casing 13 is connected in any suitable manner into the gas main, the connection of conduit 21 to the outlet is not shown but it is conventional. The force exerted by the lever 17 and weight 19 is opposed to the force of the outlet control pressure on the diaphragm, and changes in the outlet pressure regulate the valve openings during operation as will appear.

Diaphragm stem 15 projects into the upper part of valve casing 13 where it is suitably connected to a vertical valve stem 22 slidably guided within an inlet bowl assembly 23 removably secured, as by studs 24, upon an internal vertical wall 25 that separates the interior of valve casing into an inlet chamber 26 open to the inlet main and a bowl chamber 27 open to the outlet main. Wall 25 has a circular opening 28 through which gas under pressure enters the bowl assembly 23, and in which opening the bowl assembly 23 is piloted by a cylindrical boss 29.

In general this arrangement is disclosed in MacLean Patent No. 2,195,337 and per se does not comprise part of the present invention.

As illustrated in Figures 2 and 3, the inlet bowl assembly comprises a flange 31 that seats on wall 25 and an integral valve bowl 32, and it contains a passage 33 aligned with wall opening 28. The outer end of passage 33 is closed by a hand hole plate 34 secured to the bowl as by bolts 35, with a sealing gasket 36 between them.

Bowl 32 is formed with vertically aligned upper and lower identical circular openings 37 and 38, and valve seat members 39 which are identical but reversed and are mounted in the respective openings. Each valve seat member 39 comprises a short cylindrical pilot boss 41, which centers it with its associated opening 37 or 38, a radial shoulder 42 adapted to seat on a cooperating internal shoulder 43 in opening 37 and 44 in opening 38, and an enlarged flange 45 having a series of holes 46 through which extend bolts and other fastening elements 47 for attaching the seat member to the bowl. A plurality of tapped holes 50 are provided in the valve seat members so that when it is desired to remove a valve seat member the screws 47 are withdrawn and threaded into holes 50 to abut against the bowl 32 and jack the valve seat member out of the bowl. Gaskets 48 are provided on the shoulders to seal the joint between the valve seat members and the bowl when fastening members 47 are tightened.

Each valve seat member 39 has a central cylindrical bore 49 which is formed at opposite ends with concentric annular oppositely and equally inclined conical valve seat faces 51 and 52. Faces 51 and 52 lie in surfaces of revolution that intersect within bore 49. Each of these faces 51 and 52 is of the same size and disposed at the same angle, preferably about 45°, to the vertical axis of openings 37 and 38. It will be noted that upper and lower valve seat members 39 are physically reversed with respect to each other in their operative positions as illustrated in Figure 2.

Internally, bowl 32 is formed with an integral transverse web 53 that has an integral boss 54 containing a vertical cylindrical bore 55 coaxial with valve seat openings 37 and 38. Bore 55 is lined with spaced cylindrical bushings 56 which are preferably of some hard plastic that is resistant to wear and that tends to reduce and dampen the transmission of vibration and noise.

Valve stem 22 extends through bore 55 and the valve seat members 39. Valve stem 22 comprises an enlarged central guide section 57 which is non-circular, preferably regular hexagonal, with its diameter across corners just enough smaller than the inside diameter of the bushings 56 to provide a running clearance. The valve stem 22 is cadmium plated and preferably the corners of hexagonal guide section 57 are polished and rounded slightly and this prevents cutting into the bushings and insures that the valve stem is concentric with its guide. This construction provides for a minimum amount of bearing contact area between the valve stem 22 and its guide thereby holding friction to a minimum while at the same time reducing noise and vibration and increasing the sensitivity of the valve to small changes in outlet pressure. Guide section 57 is of course long enough to remain in the guide during its entire stroke, and a set screw 70 slidably engaging a flat on the hexagon is provided on boss 54 to to prevent rotation of the valve stem in operation.

Above guide section 57, the valve stem is formed with a reduced threaded section 58 and an upwardly facing radial shoulder 59 between the sections. A valve member 60 having a head 61 and a reduced shank 62 is fixed upon the valve stem. Valve member 60 is formed with a central bore 63 that is threaded at 64, within the shank 62. Valve member 60 is threaded onto stem section 58, being turned down until it seats tightly on a suitable washer 65 on stem shoulder 59. A suitable seal washer 66 and nut 67 are also mounted on the threaded stem section 58 and turned tight to clamp valve 60 onto the stem. Nut 67 is located well down within bore 49 and thus provides a compact assembly.

Referring to Figure 7, the upper flat surface 68 of valve 60 which is engaged by the seal washer 66 is rounded about its periphery so that it has a substantially parabolic surface 69 that extends down to a radial ledge 71. Surrounding ledge 71 is an annular concentric conical valve seat face 72 which is preferably disposed at about 45° to the vertical axis, seat faces 51 and 52 being at about 45° to the vertical axis. When the valve is closed as in Figure 2, valve faces 52 and 72 are substantially in full surface engagement.

Below guide section 57, the valve stem is formed with a reduced section 73 that is threaded at the end at 74 for threadedly and axially adjustably mounting the lower valve member 60 on the stem. In the closed valve position of Figure 2, valve seat faces 72 and 51 are in full surface engagement. It will be noted that although the identical valve seat members are relatively reversed, the valves are not.

Preferably the threaded stem section 58 is a left hand thread to prevent uncoupling of the valve stem from coupling block 76 during assembly and adjustment of the lower valve 60 on the valve stem. This left hand thread has also been found to be an improvement that solves a problem which has been the source of many customer complaints in prior regulators. It was found that the high velocity gas entering passage 33 so impinged on the valves as to tend to rotate them and the stem in a direction tending to uncouple block 76 and stem 22. By providing a left hand thread at 58 it has been found that the entering gas velocity force tends to so rotate the stem 22 as to tighten its coupling connection so that this source of trouble has been avoided in our invention. This is particularly useful in installations where screw 70 may be omitted or carelessly loosened to permit stem 22 to rotate. Preferably the coupling block 76 is the same as that disclosed in application for Letters Patent Serial No. 749,470 filed May 21, 1947 by Thomas A. Thorn, which has been issued as United States Letters Patent No. 2,606,051 granted August 5, 1952.

It is also preferable that fine threads be used at the lower section 74 of the valve stem, for fine adjustment of the lower valve 60 into correct axial spacing with respect to upper valve 60 so that both valves open and close at the same time. For the sake of standardization in manufacture, both threaded sections 58 and 74 are left hand fine threads.

In pressure regulators such as that of MacLean Patent 2,197,337 it is customary to provide a diaphragm stop within the diaphragm casing to limit downward displacement of the valve. In the present invention, we have provided a construction wherein the downward travel of the valve stem is limited by means within the valve casing, thereby eliminating the need for such a special stop in the diaphragm casing. This action is provided by the abutment of the lower end surface 77 of upper valve 60 upon the upper flat surface 78 of boss 54. Thus opening travel of the valve is determined by positive abutments within the valve casing and engaged by the upper valve 60.

A very important feature of the invention is the reversibility and interchangeability of upper and lower valve seat members 39. The parts are shown in Figure 2 as assembled for operation. Should lower seat 51, for example, become damaged and leaky, and no new seat member 39 be available, the upper and lower seat members 39 can be interchanged, each being reversed in the operation, so that an undamaged unused seat 51 will be provided for the lower valve and the hitherto unused seat 52 will be associated with the upper valve.

The valve members 60 are identical and this is an important feature of mass production and the reduction of assembly costs. By shortening boss 54 above web 53, and mounting upper valve 60 mainly beneath valve seat face 52, we have provided a compact assembly within the bowl that has few projections or pockets likely to cause whistles or like objectionable noises during high velocity gas flow.

Valve members 60 and seat members 39 preferably are of hardened steel and cadmium plated.

Figure 8:
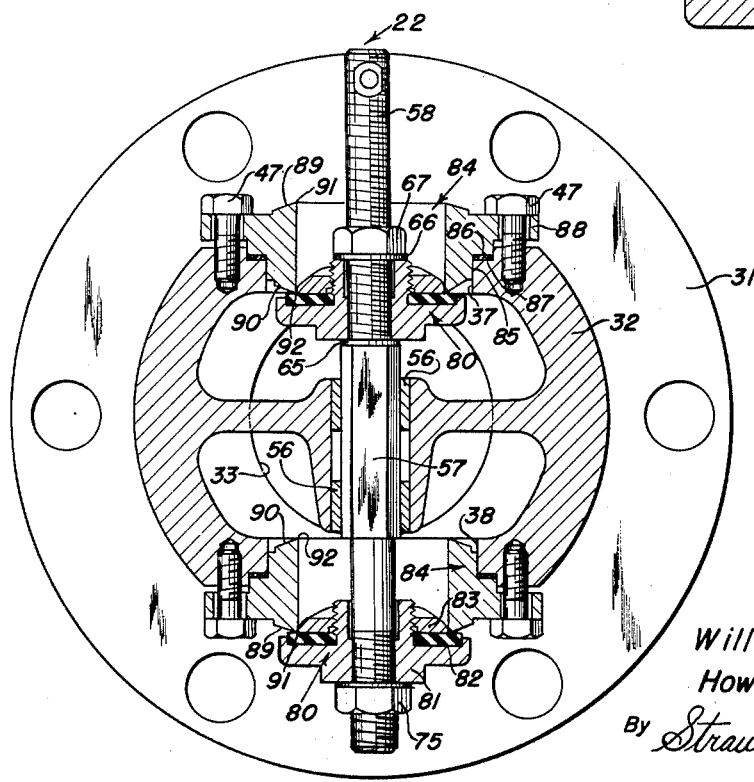
Figure 8 is a section similar to Figure 2, but illustrating the invention as applied to a soft seat valve in another embodiment.

Figure 8 illustrates a further embodiment wherein soft seat valves are employed in place of the hard seat valves of Figures 1–7. In this embodiment of the invention the same valve stem 22 is employed but the valve and valve seat members are of different structure, although the valve members are identical and the valve seat members are reversible and interchangeable double seat members as in the previous embodiment.

Each valve member 80 comprises a large strong solid head 81 having on its upper face an annular recess within which is a flat ring 82 of rubber or like resilient material. A nut 83 of smaller diameter than ring 82 and substantially parabolic in shape like surface 69 is threaded on an upstanding boss 84 to clamp ring 82 to head 81. Nut 83 thus extends over a considerable area of ring 82 and reduces the possibility of the ring being blown out of the valve by the high pressure gas. Upper valve member 80 is fixedly clamped onto stem shoulder 59 as in Figure 2, and lower valve member 80 is mounted on the stem for fine axial adjustment as in Figure 2.

Each valve seat member 84 is formed with a pilot boss 85 fitting into valve bowl opening 37 or 38, a radial shoulder 86 for seating on shoulder 87 of the bowl and a flange 88 for the usual fastening elements 47. Each valve seat member 84 also has a central cylindrical bore at opposite ends of which are equally but oppositely inclined annular conical surfaces 89 and 90 of the same size. These faces 89 and 90 lie in surfaces of revolution that intersect outside the bore. The diameter of the thin relatively sharp inner edges of these faces is greater than clamp nuts 83 so that when the valve is closed the thin valve edges 91 and 92 indent into the soft rings 82 and thus efficiently seal off the valve opening.

We have thus provided a center guide high pressure balanced valve regulator of improved mechanical strength and sensitivity, various parts being interchangeable to reduce assembly and service costs. The improved regulator is substantially noiseless in operation and of increased efficiency.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a balanced valve pressure regulator, a valve casing having a high pressure inlet and a low pressure outlet, said outlet comprising aligned bores in said casing, a valve stem slidably mounted in said casing coaxially of said bores and projecting through said bores, a valve seat member mounted in each bore, each of said valve seat members having means at one end thereof for piloting the valve seat within the associated one of said bores and means at the opposite end for securing the valve seats to said casing, and fixedly spaced valves on said stem associated with said valve seat members, each of said valve seat members having thereon a first annular portion surrounding the bore at one end and adapted to be engaged by the associated valve in closed valve position and a second and similar annular portion surrounding the bore at the other end, and said valve seat members being interchangeable to locate said second annular portions for contact with said valves so that should one of said first annular portions be damaged the second annular portions can be substituted therefor in the assembly merely by interchanging said valve seat members.

2. In the balanced valve pressure regulator defined in claim 1, said annular portions on said valve seat members comprising substantially conical faces that are oppositely inclined.

3. In the balanced valve pressure regulator defined in claim 1, said annular portions on the valve seat members comprising substantially sharp edges formed by the intersection of oppositely inclined substantially conical surfaces with said bore.

4. A reversibly interchangeable valve seat member for a pressure regulator comprising an annular element having a flange portion and a bore, substantially conical oppositely inclined annular surfaces formed on said element at opposite ends of and coaxial with said bore, and said flange portion having, thereabout, a plurality of holes, some of which are tapped and others of which are bored, whereby screws may be inserted in said bore holes for mounting said valve seat member and in said tapped holes for easily removing said valve seat member from its mounted position.

5. The valve seat member defined in claim 4, wherein said annular surfaces are surfaces of revolution that intersect within said bore.

6. The valve seat member defined in claim 4, wherein said annular surfaces are surfaces of revolution that intersect outside said bore.

7. In a balanced valve pressure regulator, a valve casing having a high pressure inlet and a low pressure outlet; said outlet comprising first and second aligned bores in said casing; a valve stem slidably mounted in said casing coaxially of said bores and projecting through said bores; first and second valve seat members mounted in said first and second bores respectively, each of said valve seat members having means at one end for piloting the valve seat within the associated bore and means at the opposite end thereof for securing the valve seat to said casing; first and second valves, each spaced on said stem for association with the first and second valve seat members respectively; each of said valve seat members having thereon a first annular portion at one end which is coaxial with the bore and which is adapted, when the valve seat member is mounted in said first bore, to be engaged by the first valve when in its closed valve position, and a second and similar annular portion at the other end coaxial with the bore and adapted, when the valve seat member is mounted in said second bore, to be engaged by the second valve when in its closed valve position, said valve seat members being interchangeable whereby the second valve seat member may be mounted in the first bore for coaction of its first annular portion with the first valve and the first valve seat member may be mounted in the second bore for coaction of its second annular portion with the second valve so that should one annular portion of a valve seat member become damaged, the corresponding annular portion of the other valve seat member may be substituted merely by the interchange of the valve seat members.

References Cited in the file of this patent

UNITED STATES PATENTS

| | | |
|---|---|---|
| 158,259 | Dulin | Dec. 29, 1874 |
| 901,991 | Newman | Oct. 27, 1903 |
| 976,055 | Duram | Nov. 15, 1910 |
| 1,033,100 | Henn | July 23, 1912 |
| 1,165,315 | Cameron | Dec. 21, 1915 |
| 1,191,084 | Kirby | July 11, 1916 |
| 1,320,132 | Gilmore | Oct. 28, 1919 |
| 1,423,178 | Brabson | July 18, 1922 |
| 1,800,995 | Gount | Apr. 14, 1931 |
| 2,195,337 | MacLean | Mar. 26, 1940 |